United States Patent
Fujii

(10) Patent No.: US 7,092,417 B2
(45) Date of Patent: Aug. 15, 2006

(54) METHOD AND APPARATUS FOR GENERATING PHASE-CORRELATION

(75) Inventor: Mikio Fujii, Kawasaki (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 109 days.

(21) Appl. No.: 10/752,532

(22) Filed: Jan. 8, 2004

(65) Prior Publication Data

US 2005/0152414 A1   Jul. 14, 2005

(51) Int. Cl.
*H01S 3/13* (2006.01)

(52) U.S. Cl. ............................... 372/29.023; 372/29.02

(58) Field of Classification Search ............ 372/29.023
See application file for complete search history.

(56) References Cited

OTHER PUBLICATIONS

Lee et al, Quantum Teleportation via mixed two mode squeezed states in the coherent state representation, Journal of the Korean Physical society, vol. 42, No. 4, Apr. 2003, pp. 457-461.*

Bennett, C. H. et al., "Teleporting an Unknown Quantum State via Dual Classical and Einstein-Podolsky-Rosen Channels", Physical Review Letters, vol. 70, No. 13, pp. 1895-1899, (Mar. 29, 1993).

Braunstein, S. L. et al., "Teleportation of Continuous Quantum Variables", Physical Review Letters, vol. 80, No. 4, pp. 869-872, (Jan. 26, 1998).

Furusawa, A. et al., "Unconditional Quantum Teleportation", Science, vol. 282, pp. 706-709, (Oct. 23, 1998).

Rudolph, T. et al., "Requirement of Optical Coherence for Continuous-Variable Quantum Teleportation", Physical Review Letters, vol. 87, No. 7, pp. 077903-1-077903-4, (Aug. 13, 2001).

Fujii, Mikio, *Continuous-variable quantum teleportation with a conventional laser*, Phys. Rev. A, vol. 68, pp. 050302-1—050302-4, Nov. 26, 2003.

* cited by examiner

*Primary Examiner*—Armando Rodriguez
(74) *Attorney, Agent, or Firm*—Finnegan, Henderson, Farabow, Garrett & Dunner, L.L.P.

(57) ABSTRACT

According to each embodiment of the present invention, a phase-correlation can be generated between respective laser fields produced by a plurality of independent lasers. Specifically, based on a structure that first and second laser fields each having a mixed quantum state represented by a single-mode Glauber coherent state that a phase is completely indeterminate are mixed with each other and a quantum continuous measurement is performed by causing absorbers to individually cross two output quantum states, the phase-correlation can be generated between the first and second laser fields when absorption by the absorbers massively occurs in one of the two quantum states as a result of the quantum continuous measurement.

21 Claims, 14 Drawing Sheets

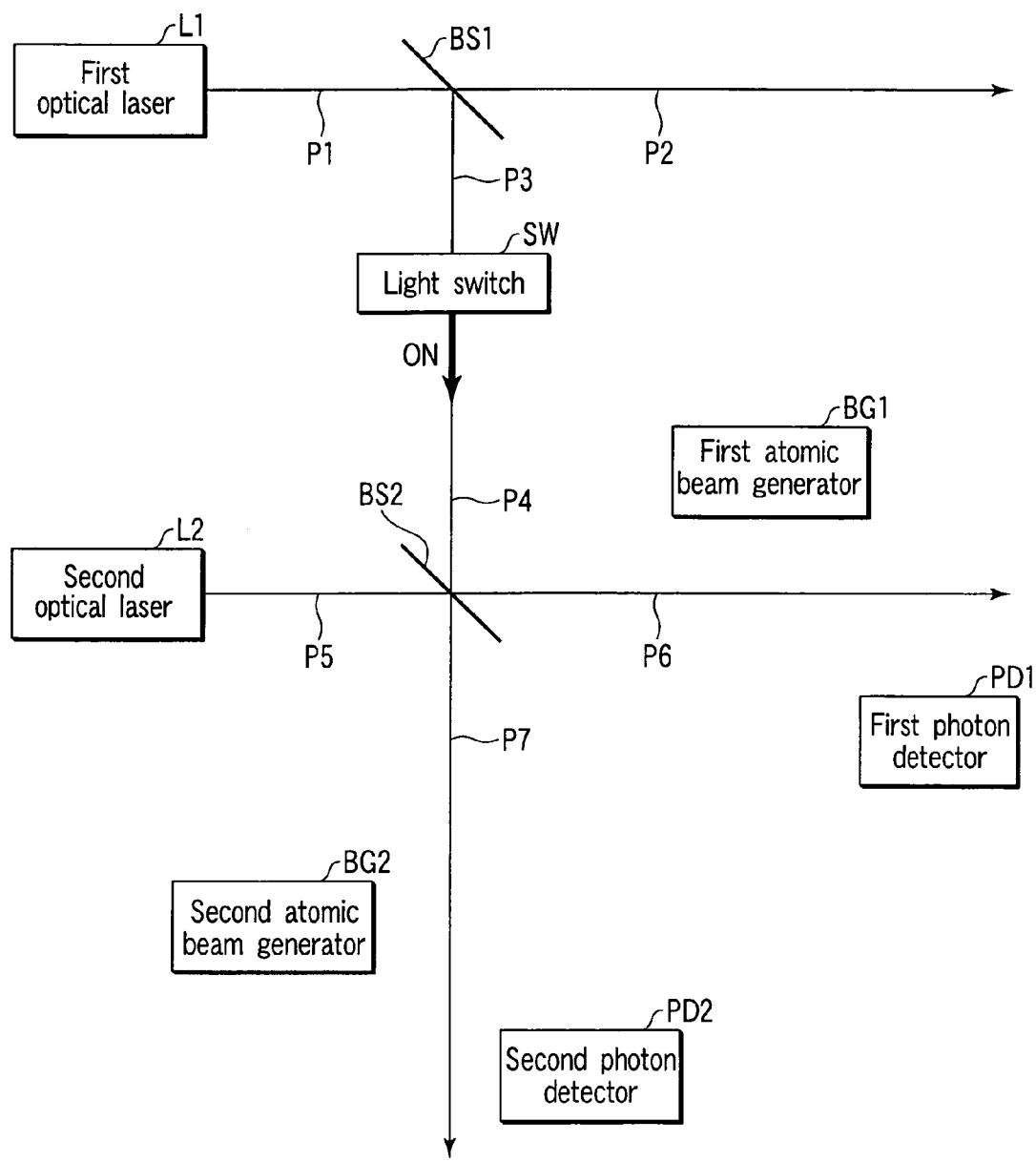
F I G. 3

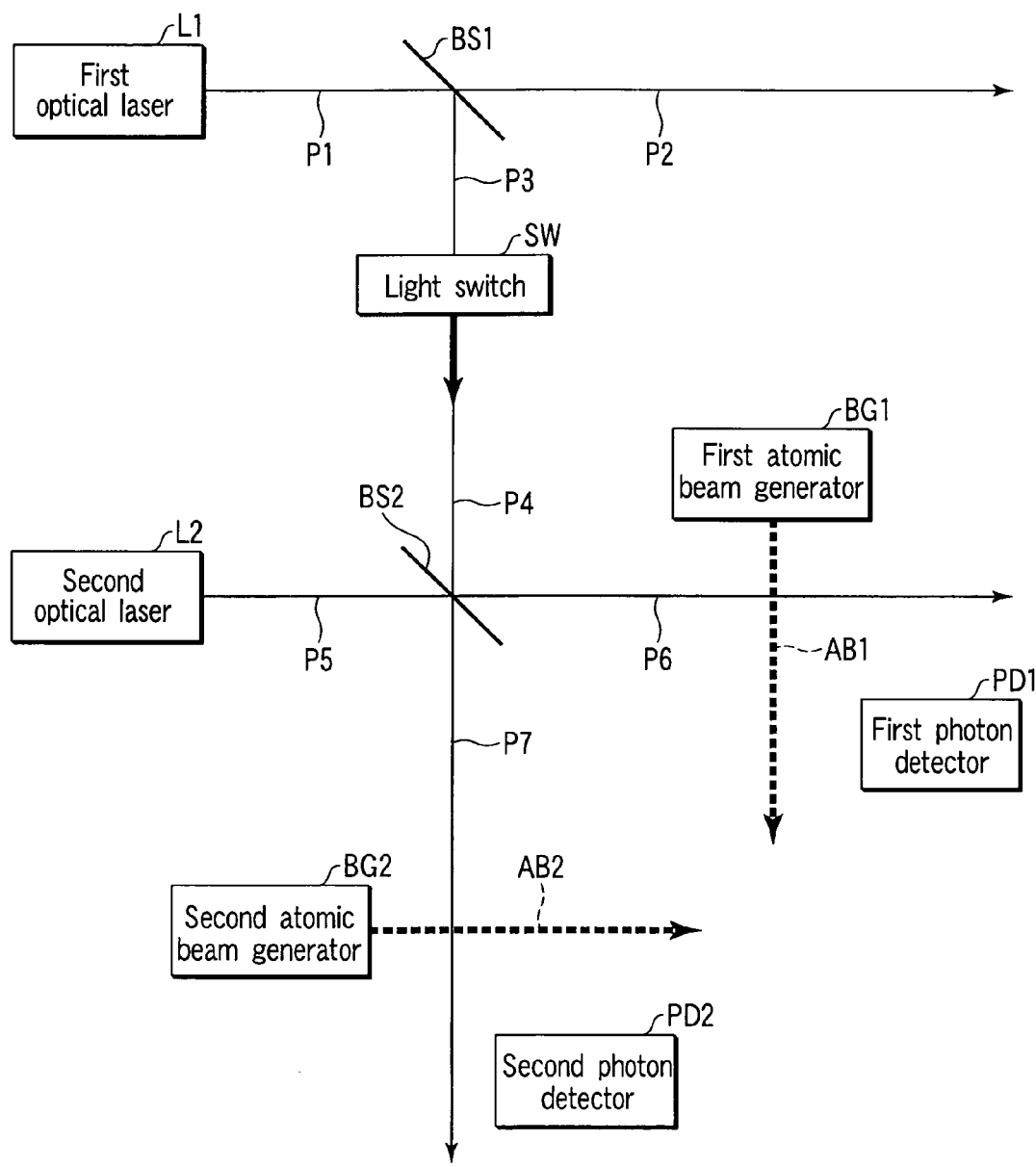
F I G. 4

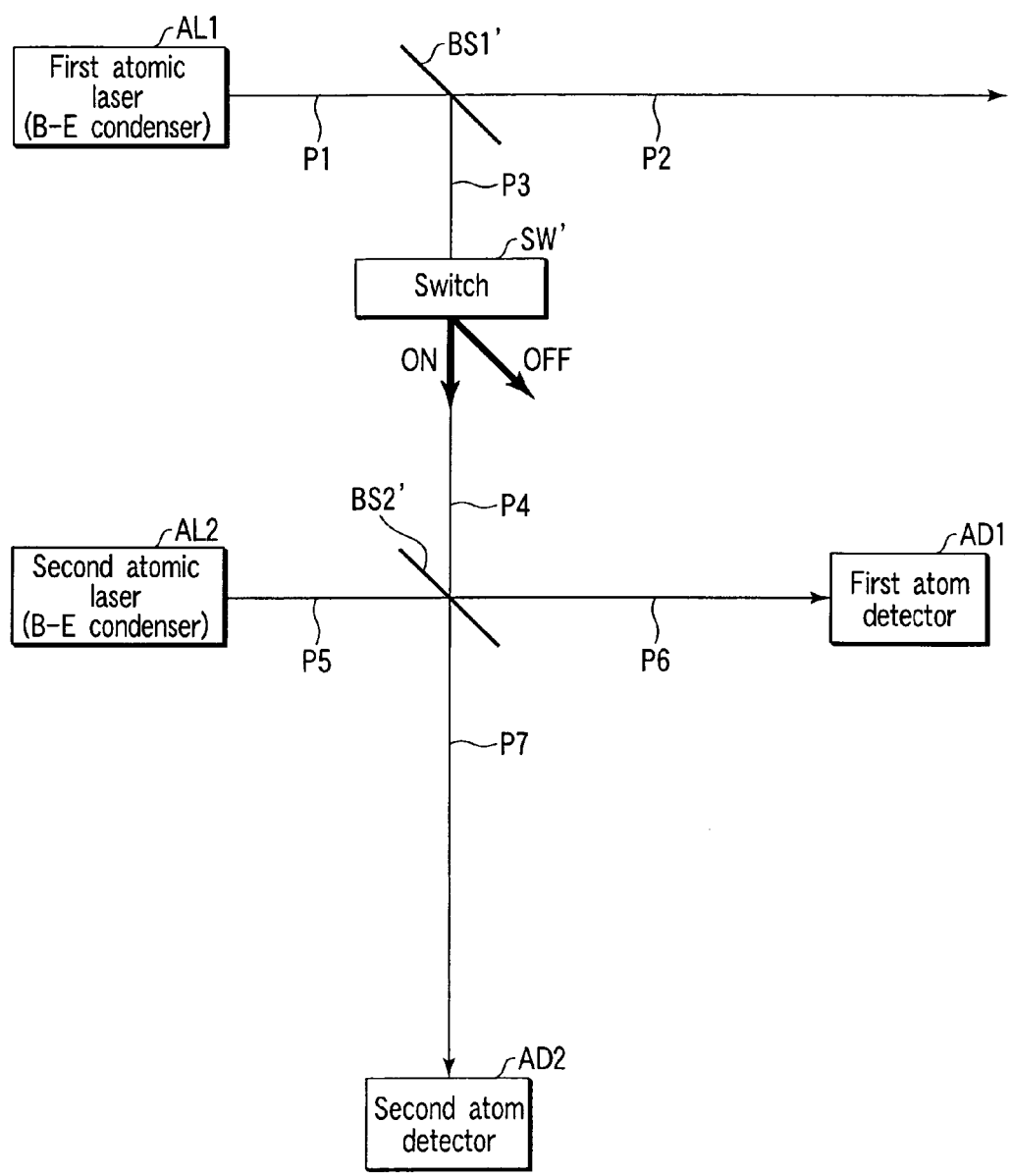
F I G. 8

METHOD AND APPARATUS FOR GENERATING PHASE-CORRELATION

BACKGROUND OF THE INVENTION

The present invention relates to a method and apparatus for generating a phase-correlation which is essential as a resource in such quantum information science as a quantum computer, quantum communication, quantum cryptography and others.

It is often the case that a laser field generated by an optical laser is described as an electric field that a phase component in a quantum state (pure state) called a coherent state is determinate.

However, according to laser theory properly based on a quantum theory, it is clearly shown that a steady-state laser field is in a coherent state (mixed state) that a phase component is completely indeterminate. As a result, it can be understood that a phase of the laser field proceeds to the steady state and becomes diffused with time irrespective of an initial state of that phase.

In a prior art, one laser as a reference is set, and synchronization of the entire phase is achieved by continuously supplying a laser field to each part from this laser in order to eliminate the indeterminateness of the phase of the laser field in the mixed state.

Specifically, laser beams in the mixed state are divided by using a half beam splitter and supplied to each part. At this time, it can be understood from a simple calculation that quantum states of respective output ports of the half beam splitter have a phase-correlation with respect to each other. It is well known from experience that such a phase-correlation is strong relative to a decoherence due to the environment.

Such a phase-correlation is useful for a communication protocol called quantum teleportation, for example (C. H. Bennette, et al., Phys. Rev Lett. 70, 1895 (1993).).

Quantum teleportation is currently verified by an experiment system mainly using photons. It is typified as a substantive experiment (A. Furusawa et al., Science 282, 706 (1998).) of a protocol called an infinite dimension quantum teleportation (S. L. Braunstein and H. J. Kimble, Phys. Rev. Lett. 80, 869 (1998).). In this substantive experiment, an original protocol that a measured value takes a discrete value is expanded in such a manner that a measured value becomes a continuous quantity in the light of readily enabling the application of a laser beam source.

On the other hand, in relation to this substantive experiment, it is revealed that a transmission side and a reception side must be physically connected with each other in a light path which does not exist in the original protocol in order to eliminate the phase indefiniteness that the laser field essentially has and maintain a phase-correlation between the transmission side and the reception side (T. Rudolph and B. C. Sanders, Phys. Rev. Lett. 87, 077903 (2001)). In order to realize the infinite dimension quantum teleportation which does not have such an extra light path, according to investigation conducted by the present inventors, a scheme that two or more independent laser beam sources have a phase-correlation is required.

BRIEF SUMMARY OF THE INVENTION

It is an object of the present invention to provide a method and an apparatus capable of generating a phase-correlation between respective laser fields generated by a plurality of independent lasers.

According to a first aspect of the present invention, there is provided a phase-correlation generation method for generating a phase-correlation between a plurality of laser fields, comprising: a step of generating a first laser field which has a quantum state which is in a mixed state represented by a single-mode Glauber coherent state that a phase is completely indeterminate; a step of generating a second laser field which has the same quantum state as the above-described quantum state; a step of inputting the first laser field and the second laser field to diverging means which demonstrates an effect of a linear optical element or a mutual effect equivalent to this effect; a step of mixing the input first and second laser fields and outputting two quantum states by the diverging means; and a step of performing a quantum continuous measurement by causing absorbers in the quantum state to individually cross the output two quantum states, and generating a phase-correlation between the first and second laser fields.

According to a second aspect of the present invention, there is provided a phase-correlation generation apparatus which generates a phase-correlation between a plurality of laser fields, comprising: first laser field generating means for generating a first laser field which has a mixed quantum state in a mixed state represented by a single-mode Glauber coherent state that a phase is completely indeterminate; second laser field generating means for generating a second laser field having the same quantum state as the above-described quantum state; diverging means for mixing the first and second laser fields, causing them to diverge into two quantum states and outputting them when the first laser field and the second laser field are input thereto; and means for causing absorbers in the quantum state to individually cross the output two quantum states and performing a quantum continuous measurement.

According to the first and second aspects of the present invention, based on a structure that first and second laser fields having the mixed quantum state represented by a single-mode Glauber coherent state that a phase is completely indeterminate are mixed with each other and absorbers are caused to individually cross the output two quantum states in order to perform a quantum continuous measurement, a phase-correlation can be generated between the first and second laser fields when a large quantity of absorption is generated in one of the two quantum states due to the absorbers as a result of a quantum continuous measurement. That is, a phase-correlation can be generated in respective laser fields generated by a plurality of independent lasers.

BRIEF DESCRIPTION OF THE SEVERAL VIEWS OF THE DRAWING

FIGS. 3 to 7 are type drawings illustrating the phase-correlation generation method in the same embodiment;

FIG. 8 is a type drawing showing a structure of a phase-correlation generation apparatus according to a second embodiment of the present invention;

DETAILED DESCRIPTION OF THE INVENTION

Figure 1:
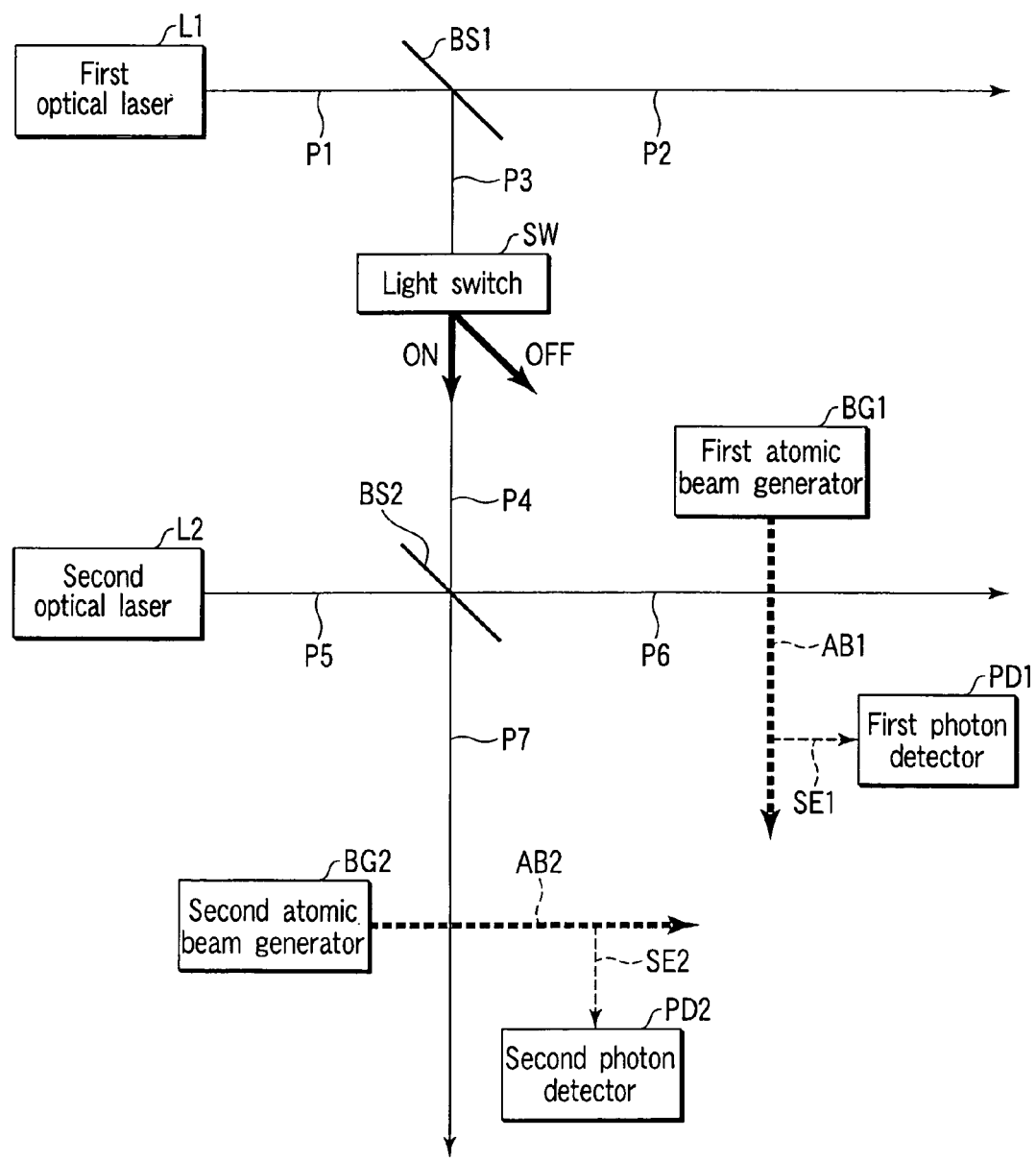
FIG. 1 is a type drawing showing a structure of a phase-correlation generation apparatus according to a first embodiment of the present invention.

Each embodiment according to the present invention will now be described with reference to the accompanying drawings. However, an outline of the present invention will be explained before the embodiments.

First, a consideration will be given as to an example that a phase-correlation is generated from two independent single-frequency CW (continuous-wave) laser beam sources which are of the same type. It is assumed that the two laser beam sources are in a steady state and they generate two equal laser fields each having a sufficiently large average intensity. The two laser fields are input to two input ports of a half beam splitter. The respective laser fields are mixed in the half beam splitter, and output from two output ports of the half beam splitter.

Then, absorbers of photons required to properly conduct a quantum continuous measurement are prepared, and the quantum continuous measurement is performed. In the quantum continuous measurement, the number of photons may be detected by a photon detector having a very high time resolution with which the number of photons can be always accurately counted one by one even in case of, e.g., a very strong laser field.

Moreover, a further realizable example, the same effect can be expected by conducting the quantum continuous measurement in the following manner. This example is described in, e.g., the following cited reference.

M. Fujii, Phys. Rev. A 68, 050302(R) (2003).; the entire contents of which are incorporated herein by reference.

That is, infinitely many resonant atoms such that two energy level differences match with a frequency of a laser field are prepared, and each resonant atom is set in a ground state. Two atomic beams constituted of these resonant atoms are prepared, and the respective atom beams are caused to simultaneously cross two output light beams from the half beam splitter. However, the respective atomic beams are of the same type. It is assumed that the respective atomic beams are adjusted as described below in (i) to (iii).

(i) The atoms are emitted one by one.

(ii) A gap between advancing directions of the emitted atoms is equal to or slightly larger than a beam width of the output light beams.

(iii) An advancing speed of the atoms is such a speed as that a mutual effect time of the atoms and the laser field becomes sufficiently short.

In the first embodiment, optical lasers are used, and independent laser fields mixed by the half beam splitter are subjected to the quantum continuous measurement, thereby generating quantum states having a phase-correlation.

When changes in the two output port light beams from the half beam splitter are traced based on a theory of the quantum continuous measurement, it can be understood that the respective output port light beams demonstrate different convergences. That is, the light beams from one output port converge into a quantum. state showing a Poisson type photon number distribution which is twofold of an average intensity of each laser field since it is often the case that the photons are absorbed by crossing atoms (quantum jump). The light beams from the other output port converge into a vacuum state having no light at all since it is often the case that the photons are not absorbed by the crossing atoms.

Such a difference in convergence is the same as that of a quantum state having a phase-correlation generated by using one laser beam source and one beam splitter. The two output port light beams have an equal probability that the photon number distribution approximates a Poisson distribution, which is ½.

Generally, a field of a photon system is attenuated by an effect of a null measurement that the absorbers do not absorb the photons in the two output ports light beams at the time of quantum continuous measurement. However, when the intensity of each laser field is very large, since an absorption frequency of the photons is large, the attenuation becomes relatively very small. Here, in order to greatly increase the intensity of each laser field, generating a steady state of the photons by using an oscillating high-output optical laser can suffice.

It is to be noted that the present invention is not restricted to the optical laser, and it can be likewise carried out when utilizing Bose-Einstein condensation using an atomic laser. An example using this atomic laser will be described in connection with a second embodiment.

The above is the outline of the present invention. The first embodiment according to the present invention will now be described.

FIRST EMBODIMENT

FIG. 1 is a type drawing showing a structure of a phase-correlation generation apparatus according to the first embodiment of the present invention. This phase-correlation generation apparatus includes: first and second half beam splitters BS1 and BS2, a light switch SW, first and second atomic beam generators BG1 and BG2, and first and second photon detectors PD1 and PD2 with respect to first and second optical lasers L1 and L2.

Here, the first optical laser (first laser field generating means) L1 generates a first laser field having a mixed quantum state represented by a single-mode Glauber coherent state that a phase is completely indeterminate, and outputs this first laser field to the first half beam splitter BS1. It is to be noted that the mixed state in the quantum state is realized by using a steady state of photons generated when the first optical laser L1 is oscillating. Additionally, P1 denotes a light path between the first optical laser L1 and the first half beam splitter BS1.

The first half beam splitter BS1 causes the first laser field input from the light path P1 into two, and outputs them as light paths P2 and P3, respectively.

The light switch SW passes the first laser field input from the light path P3 to a light path P4, or disconnects it.

On the other hand, the second optical laser (second laser field generating means) generates a second laser field having the same quantum state as that of the first laser field generated by the first optical laser L1, and outputs this second laser field to the second half beam splitter BS2. Here, a mixed state in the quantum state is realized like that in the first optical laser L1. Further, P5 denotes a light path between the second optical laser L2 and the second half beams splitter BS2.

The second half beam splitter (diverging means) BS2 is a liner optical element which mixes the first and second laser fields, causes them to diverge into two quantum states and respectively outputs them to light paths P6 and P7 when the first laser field is input from the light path P4 and the second laser field is input from a light path P5.

The first atomic beam generator BG1 is used to hold absorbers which are in a quantum state, generate atomic beams AB1 composed of individual atoms of the absorbers, and cause them to cross a quantum state of the light path P6. Here, the absorbers are formed of an energy two-level atom group which resonates with a frequency of a mixed mode represented by the Glauber coherent state in the first and second laser fields, and have the energy of this atom group being set in a ground state.

The first photon detector PD1 has a regular time resolution, and it is used to detect a photon SE1 which is spontaneously emitted by the absorber which has absorbed the photons in the absorbers which have crossed the quantum state of the light path P6. Here, the regular time resolution means a time resolution lower than a time resolution per photon. However, the regular time resolution is not a prerequisite, and it is needless to say that it may be a time resolution per photon.

The second atomic beam generator BG2 is used to hold absorbers which are in a quantum state, generate atomic beams AB2 composed of individual atoms of the absorbers, and cause them to cross a quantum state of the light path P7. Here, the same absorbers as the absorbers held by the first atomic beams generator BG1 are used.

The second photon detector PD2 has a regular time resolution, and it is used to detect a photon SE2 which is spontaneously emitted by an absorber which has absorbed the photons in the absorbers which have crossed the quantum state of the light path P7. In the second photon detector PD2, the same time resolution as that of the first photon detector PD1 is used.

Figure 2:
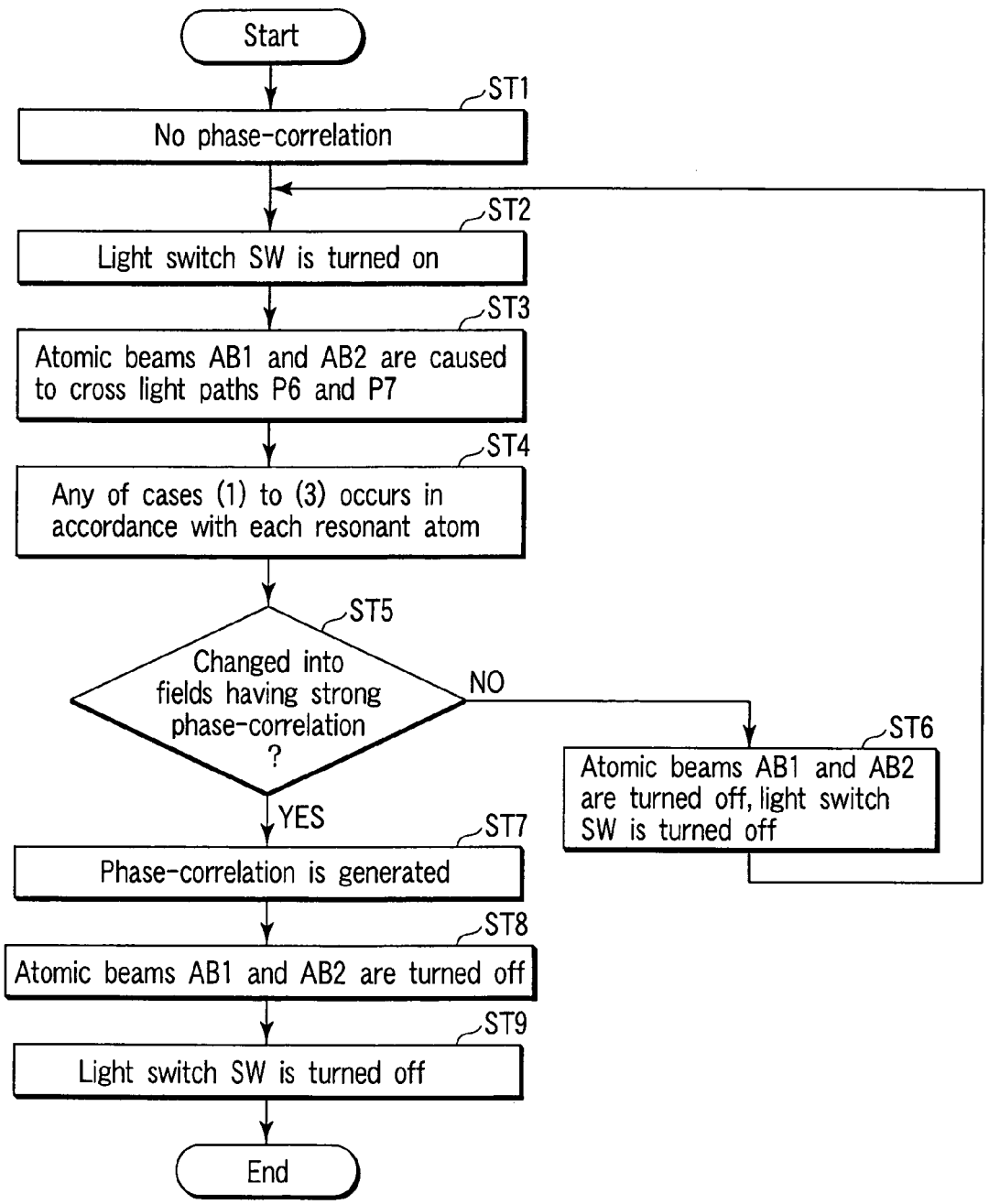
FIG. 2 is a flowchart illustrating a phase-correlation generation method in the same embodiment.

A phase-correlation generation method using the thus configured phase-correlation apparatus will now be described with reference to a flowchart of FIG. 2.

The following description shows a procedure to generate a phase-correlation between two independent quantum states (first and second laser fields) having no phase-correlation and provide the phase-correlation. Optical lasers L1 and L2 are used as lasers which provide quantum states as initial states, and resonant atomic lasers AB1 and AB2 set to a ground state are used in a quantum continuous measurement.

A steady state of a laser field is represented as an addition of coherent states that a phase is completely random as a mixed state, and there is not phase-correlation between a plurality of independent laser fields as it stands (ST 1).

First, as shown in FIG. 3, the light switch SW is turned on in order to connect the light paths P3 and P4 with each other (ST 2), and the independent first and second laser fields are connected by using the second half beam splitter BS2. The second half beam splitter BS2 mixes the first and second laser fields input from the light paths P4 and P5, and outputs a result as two quantum states to the light paths P6 and P7.

On the other hand, it is assumed that the atomic beams AB1 and AB2 constituted of energy two-level atoms which resonate with frequencies of the laser fields are initially all set to a ground state.

Then, as shown in FIG. 4, the first and second atomic beam generators BG1 and BG2 cause the atomic beams AB1 and AB2 to cross the light paths P6 and P7, respectively (ST 3). At this time, as a result of the mutual effect with the photons, any of the following cases (1) to (3) occurs to each resonant atom which passes through the respective light paths P6 and P7 (ST 4).

(1) A case that the atoms of the both atomic beams 1 and 2 do not absorb the photons.

This case (1) occurs with a highest occurrence probability. The phase-correlation of the laser fields remains unchanged, but the intensity of the laser field of each of the light paths 6 and 7 is attenuated.

(2) A case that the atoms of either the atomic beams 1 or 2 absorb the photons, and the atoms of the other atomic beams do not absorb the photons.

The case (2) occurs with an occurrence probability which is lower than that of (1) but cannot be ignored. The laser field provokes a reduction of wave packet due to the quantum continuous measurement, and is projected into a state that the phase-correlation of the independent respective laser fields becomes larger. That is, the strong phase-correlation is generated between the first and second laser fields when the case (2) massively occurs in one of the light paths P6 and P7. It is to be noted that an average photon number of the light path P6 or P7 crossing the atoms which have provoked absorption is thereby larger than an average photon number of the light path P7 or P6 in which no absorption has occurred. Therefore, an operator of the apparatus can confirm a generation status of the phase-correlation by counting the number of photons which have been absorbed in the light path P6 or P7.

(3) A case that the atoms of both the atomic beams 1 and 2 simultaneously absorb the photons.

This case (3) can be ignored since its occurrence probability is very small as compared with (1) and (2).

Any of the cases (1) to (3) occurs in accordance with each atom of the atomic beams AB1 and AB2. Further, any atoms of the either two atomic beams AB1 or AB2 absorb the photons, and thereafter spontaneously emit the photons. The spontaneously emitted photons SE1 or SE2 are detected by the corresponding first or second photon detector PD1 or PD2. It is to be noted that the detection of the photons SE1 and SE2 does not affect the quantum states of the light paths P6 and P7 since it does not have the mutual effect with the light paths P6 and P7.

Thereafter, in such a state, the atomic beams AB1 and AB2 having a sufficient speed are caused to cross the light paths P6 and P7 for an appropriate time, and the quantum continuous measurement is carried out. It is to be noted that the appropriate time can be a time shorter than a phase diffusion time of each laser field.

Subsequently, an operator of the apparatus judges whether the first and second laser fields have changed into fields having the strong phase-correlation as a result of the quantum continuous measurement (ST 5). This judgment is conducted based on whether there is a large bias in photon number distributions of the light paths P6 and P7 obtained from a result of detection by the respective photon detectors PD1 and PD2.

If the laser fields have not changed into fields having the strong phase-correlation as a result of judgment at the step ST 5, an operator of the apparatus turns off the atomic beams AB1 and AB2 and the light switch SW, and again performs the procedure from the step ST 2 (ST 6).

On the other hand, a description will be given as to a case that the first and second laser fields have changed into fields having the strong phase-correlation and the phase-correlation is generated as a result of judgment at the step ST 5 (ST 7).

Figure 5:
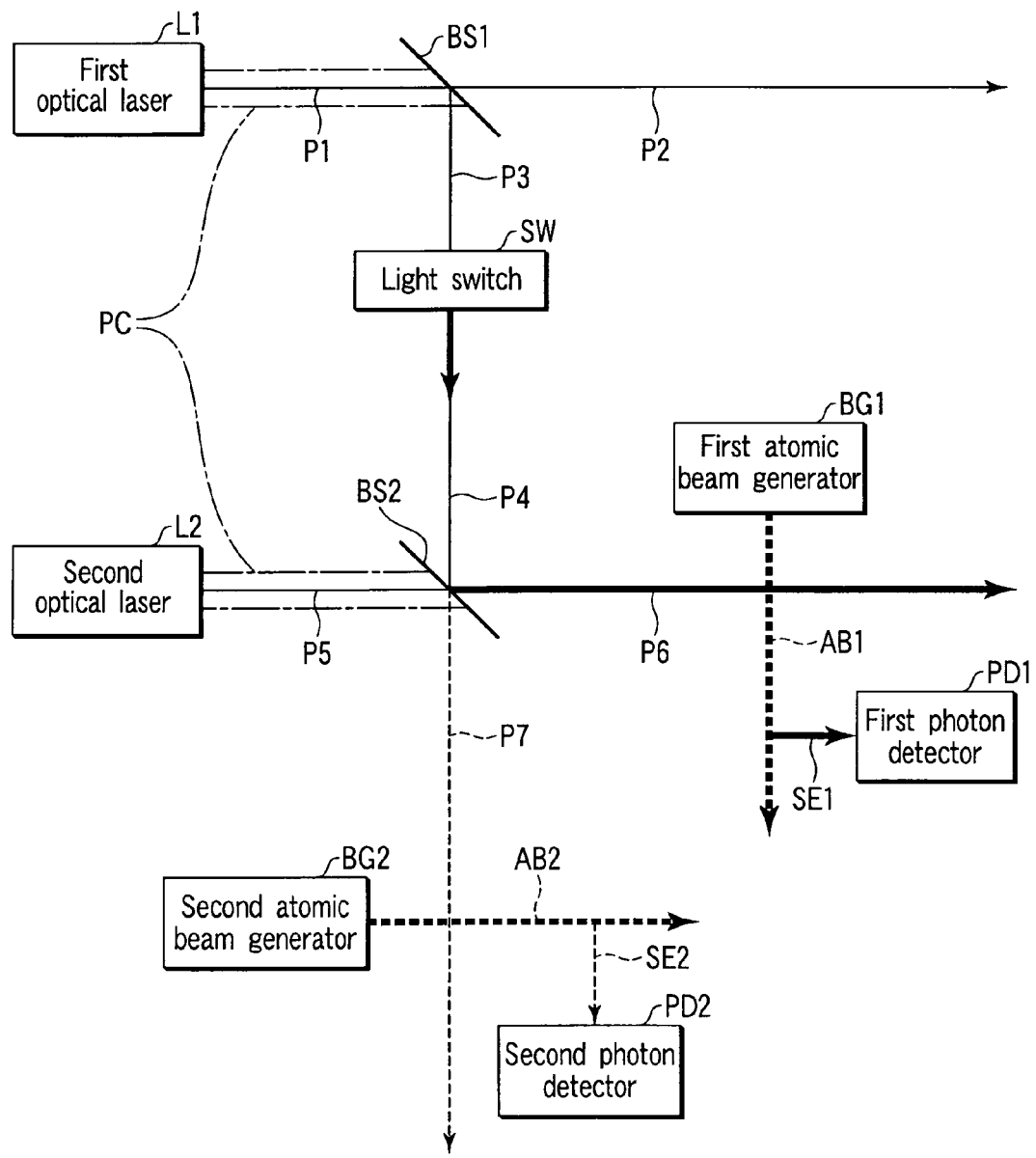
Figure 6:
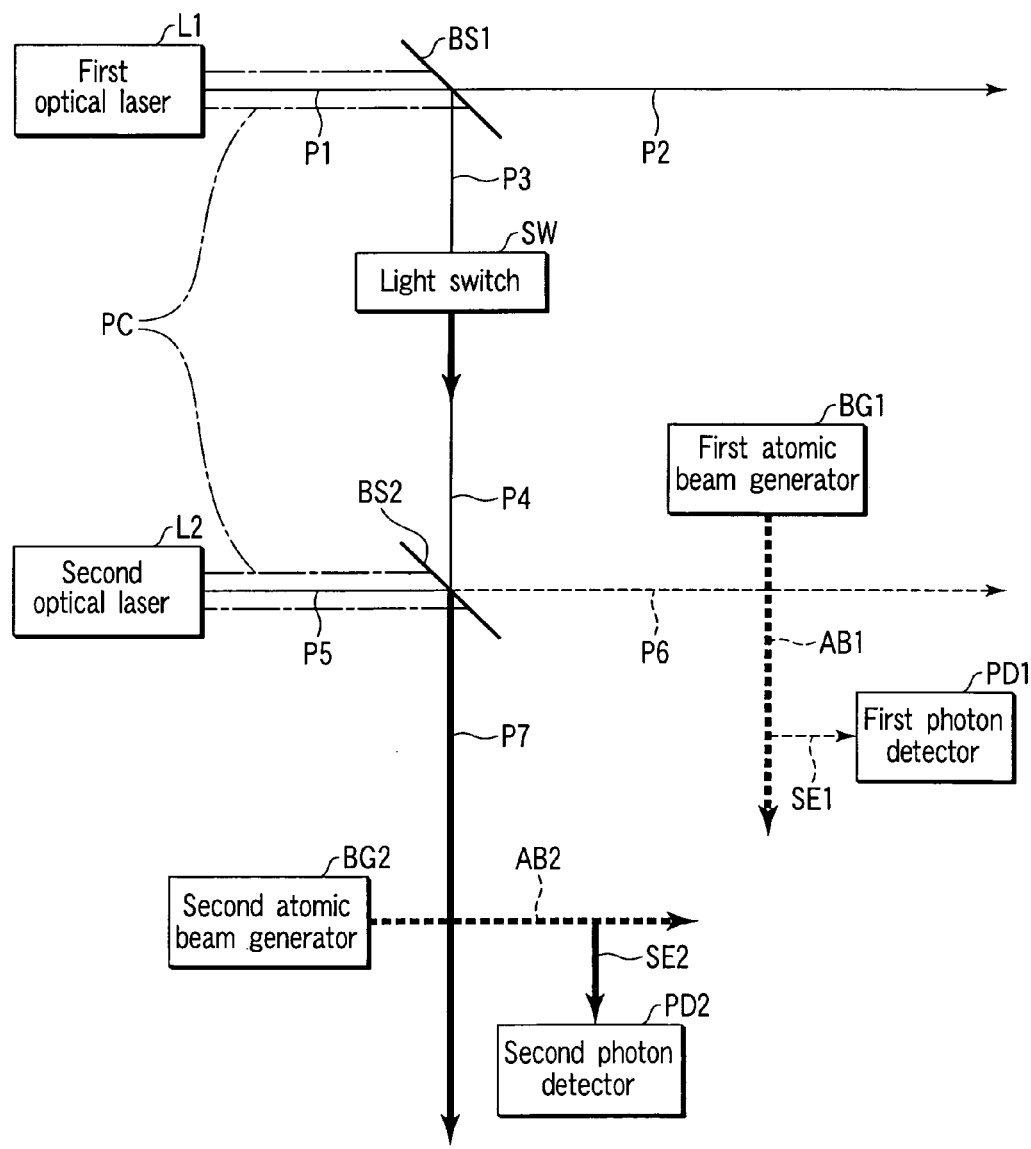

In this case, as shown in, e.g., FIG. 5, the photon number distribution of the light path P6 approximates a Poisson distribution demonstrating an average photon number which is twofold of that of each output laser field, and the photon number distribution of the light path P7 approximates a vacuum state. Alternatively, as shown in FIG. 6, the photon number distribution of the light path P7 approximates the Poisson distribution, and the counterpart of the light path P6 approximates the vacuum state. It is to be noted that the occurrence probability of the Poisson distribution of the light path P6 is equal to that of the light path P7, namely, their probabilities have a relationship of 50%: 50%. However, 50%: 50% of the occurrence probabilities is a ratio when the strong phase-correlation has been generated, and this is not a ratio of the entire operation.

At any rate, when one of the photon number distributions of the light paths P6 and P7 approximates the Poisson distribution, an operator of the apparatus determines that the phase-correlation PC is generated between the first and second laser fields. It is to be noted that FIGS. 5 and 6 show the phase-correlation PC only in the light paths P1 and P5, but the phase-correlation is also naturally generated in the light paths P2 to P4, P6 and P7 on the downstream side of the light paths P1 and P5.

Figure 7:
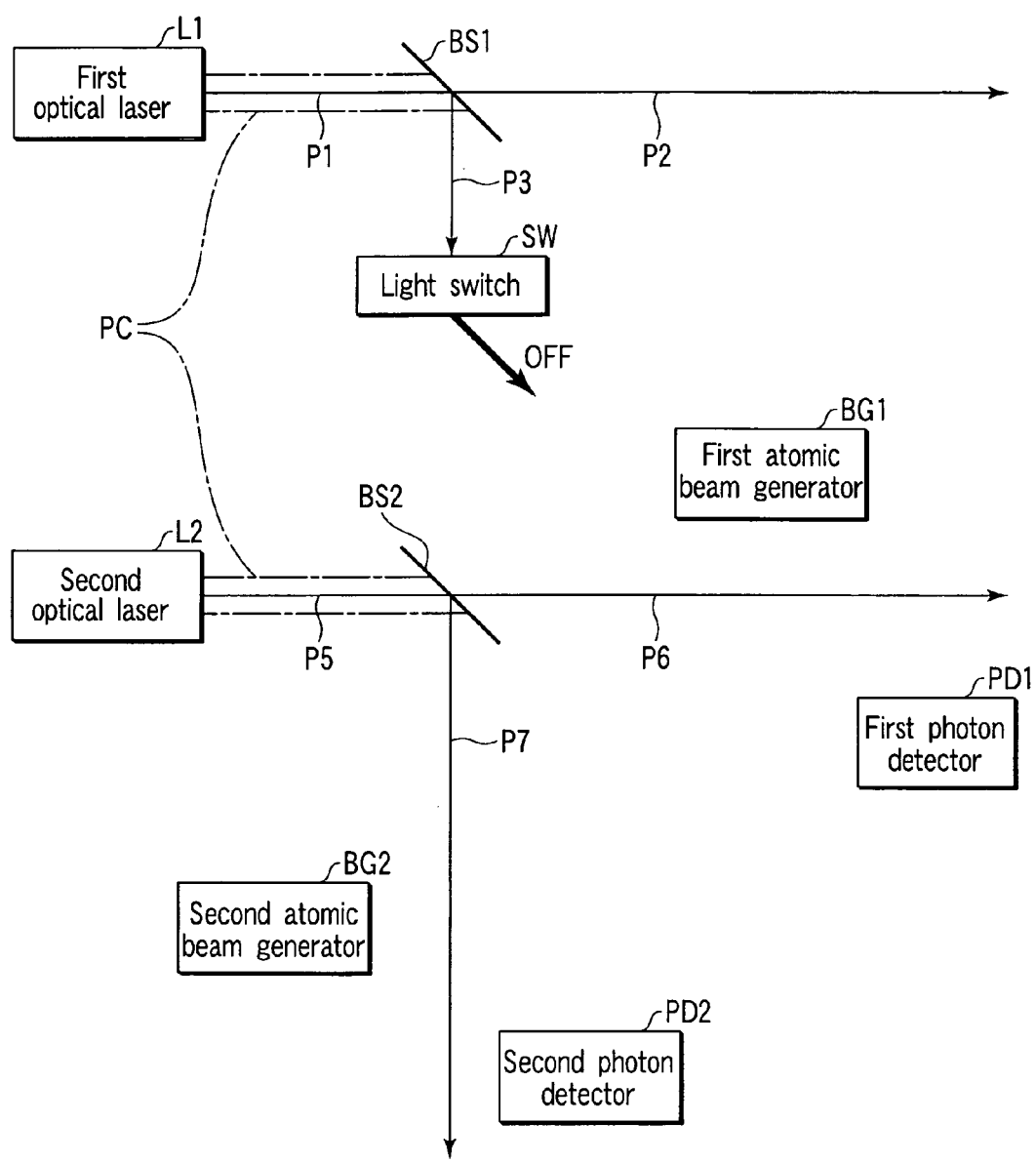

Then, after the phase-correlation PC is generated in this manner, an operator of the apparatus stops the atomic beams AB1 and AB2 as shown in FIG. 7 (ST 8).

The operator of the apparatus may use the light path P2 and the light path P6 or P7 in a desired application in this state, but the operator of the apparatus turns off the light switch SW in this example (ST 9). It is to be noted that the photon number distribution of the light path P6 becomes equal to that of light path P7 with the phase-correlation being maintained when the light switch SW is turned off.

As a result, the phase-correlation is generated in the light paths P1 and P5 and the respective light paths P2, P3, P6 and P7 on the downstream side of the light paths P1 and P5 without connecting the light paths of the respective optical lasers L1 and L2 when the operator of the apparatus disconnects the light path P3 and the light path P4 which connect the first and second optical lasers L1 and L2.

Thereafter, it is good enough that the operator of the apparatus uses the light path P2 or P3 and the light path P6 or P7 as the quantum states having the phase-correlation in accordance with an application.

As described above, according to this embodiment, the first and second laser fields having the mixed quantum states that the phase is completely indeterminate are mixed with each other, and the absorbers are caused to individually cross the two output quantum states, thereby conducting the quantum continuous measurement. Based on this structure, the phase-correlation can be generated between the first and second laser fields when absorption of the photons massively occurs in one of the light paths P6 and P7 as a result of the quantum continuous measurement. That is, the phase-correlation can be generated in the respective laser fields produced by the plurality of independent lasers.

Giving a supplement, the strong phase-correlation generated by the conventional half beam splitter can be produced from two or more independent optical lasers in this embodiment as different from the conventional one optical laser.

The effect of this embodiment becomes a great advantage in the protocol such as quantum cryptography, quantum communication and others utilizing the non-locality of the phase-correlation. For example, after the phase-correlation is generated, even if a spatial obstacle exists between parties, a non-local quantum correlation between the laser beams that the respective parties have can be maintained irrespective of the obstacle. Furthermore, as shown in FIG. 7, the phase-correlation between the two independent laser fields required for the infinite dimension quantum teleportation can be generated. As a result, since the phase-correlation between the laser beams that the respective parties distanced from each other have can be maintained, an environment required to realize the quantum teleportation between the respective parties can be created.

It is to be noted that the description has been given as to the example that an operator makes a judgment at the step ST 5 in this embodiment, but the present invention is not restricted thereto, and a judgment device may perform the judgment at the step ST 5. In this case, it is good enough that the judgment device compares the photon number distributions of the light paths P6 and P7 with each other and judges whether the laser fields have changed into fields having the phase-correlation when a ratio or a difference of their average photon numbers exceeds a predetermined value. Likewise, although the description has been given as to the example that an operator turns on/off the light switch SW or the atomic beams AB1 and AB2 at the respective steps ST2, ST3, ST6 to ST8 in this embodiment, the present invention is not restricted thereto, and a control device may turn on/off the light switch SW or the atomic beams AB1 and AB2.

Moreover, although the description has been given as to the example that the atomic beams and the spontaneously emitted light beams thereof are detected as the means for performing the quantum continuous measurement in this embodiment, the present invention is not restricted thereto, and the photon detector may be arranged in each of the light paths P6 and P7. In this case, if each of the two photon detectors has a time resolution enabling counting the number of photons one by one and these detectors are arranged so as to cross the two quantum states output to the light paths P6 and P7, the quantum continuous measurement is realized by absorption and detection of the photons. It is to be noted that the photon detectors are removed from the light paths P6 and P7 after the quantum continuous measurement. Either an operator or a device may cause the photon detectors to cross the light paths P6 and P7 or remove them. The above-described operations which may be carried out by either an operator or a device are likewise applied to the following respective modifications or the second embodiment.

Additionally, although the description has been given as to the example that the phase-correlation is generated between the two laser fields in this embodiment, the present invention is not restricted thereto, and the phase-correlation can be produced between three or more independent laser fields. In this case, after the phase-correlation is generated between the two laser fields, executing the above-described steps ST1 to ST 9 between one laser field having the phase-correlation and a newly added laser field can thereby produce the phase-correlation between the three laser fields. Thereafter, the phase-correlation can be generated between an arbitrary number of laser fields in a similar manner.

Further, although the description has been given as to the example that the first half beam splitter SB1 is provided between the first optical laser L1 and the light switch SW in this embodiment, the present invention is not restricted thereto, and it is possible to carry out a modification that the first half beam splitter BS1 is eliminated and the laser field generated by the first optical laser L1 is input to the second half beam splitter BS2 through the light switch SW. Even in such a modification, this embodiment and its extended example (example of three or more laser fields) can be similarly carried out in order to obtain similar advantages.

SECOND EMBODIMENT

FIG. 8 is a type drawing showing a structure of a phase-correlation generation apparatus according to the second embodiment of the present invention, like reference numerals denote parts equal to those in FIG. 1, and different parts will be mainly explained herein.

That is, this embodiment is a modification of the first embodiment, and first and second atomic lasers AL1 and AL2 are used in place of the first and second optical lasers L1 and L2.

Besides, this embodiment includes first and second half beam splitters BS1' and BS2' used to cause the laser fields of the atomic lasers AL1 and AL2 to diverge in place of the first and second half beam splitters BS1 and BS2 as linear optical elements. Furthermore, this embodiment includes a switch SW' which passes or cuts off the laser field of the first atomic laser AL1 in palace of the optical switch SW'. Moreover, this embodiment includes first and second atom detectors AD1 and AD2 which can individually detect atoms emitted from the atomic lasers AL1 and AL2 and effect as absorbers of the atomic lasers as means for realizing the quantum continuous measurement in place of the atomic beams AB1 and AB2 and the first and second photon detectors PD1 and PD2. The light paths P1 to P7 will be referred to as paths P1 to P7.

Here, the first atomic laser (first laser field generating means) AL1 generates a first laser field having a mixed quantum state represented by a single-mode Glauber coherent state that a phase is completely indeterminate, and outputs this first laser field to the first half beam splitter BS1'. It is to be noted that the mixed state in the quantum state is realized by using an atomic state generated by Bose-Einstein condensation.

The second atomic laser (second laser field generating means) generates a second laser field having the same quantum state as that of the first laser field produced by the first atomic laser AL1, and outputs this second laser field to the second half beam splitter BS2'. Here, the mixed state in the quantum state is realized like the first atomic laser AL1.

The second half beam splitter (diverging means) BS2' is an element which mixes the first and second laser fields, causes them to diverge into two quantum states and outputs them to the respective paths P6 and P7 when the first laser field is input from the path P4 and the second laser field is input from the path P5.

Each of the first and second atom detectors AD1 and AD2 has a resolution per atom with respect to the atomic laser field, and these detectors realize the quantum continuous measurement by absorbing and detecting individual atoms having the respective quantum states in the crossing paths P6 and P7. It is to be noted that the first and second atom detectors AD1 and AD2 are caused to cross the paths P6 and P7 when starting the quantum continuous measurement, and removed from the paths P6 and P7 when terminating the quantum continuous measurement.

To sum up, this embodiment has a structure using the atomic laser elements SW', BS1', BS2', AD1 and AD2 based on a use of the atomic lasers AL1 and AL2 shown in FIG. 8 in place of the optical lasers L1 and L2 in FIG. 1.

Figure 9:
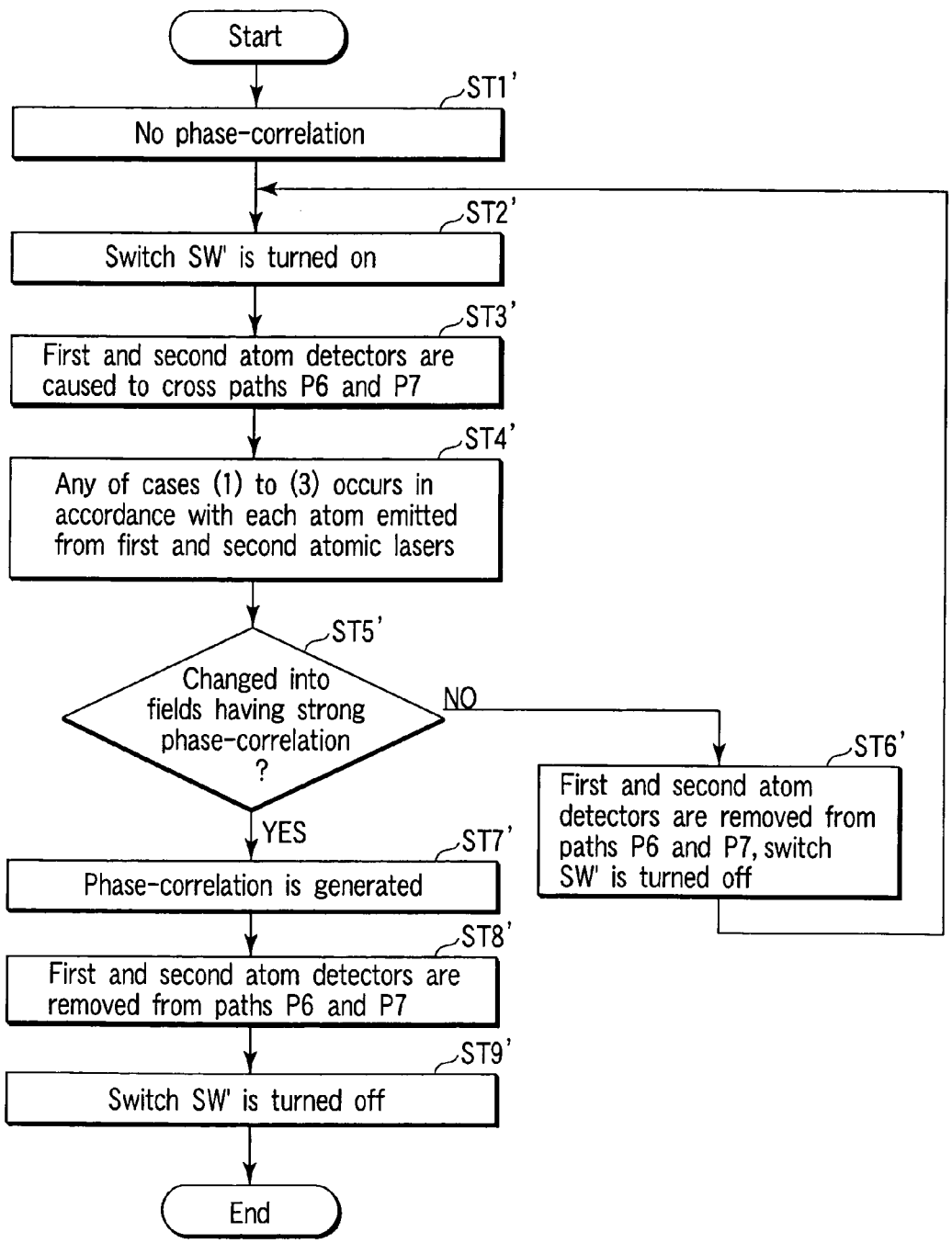
FIG. 9 is a flowchart illustrating a phase-correlation generation method according to a second embodiment of the present invention.
Figure 10:
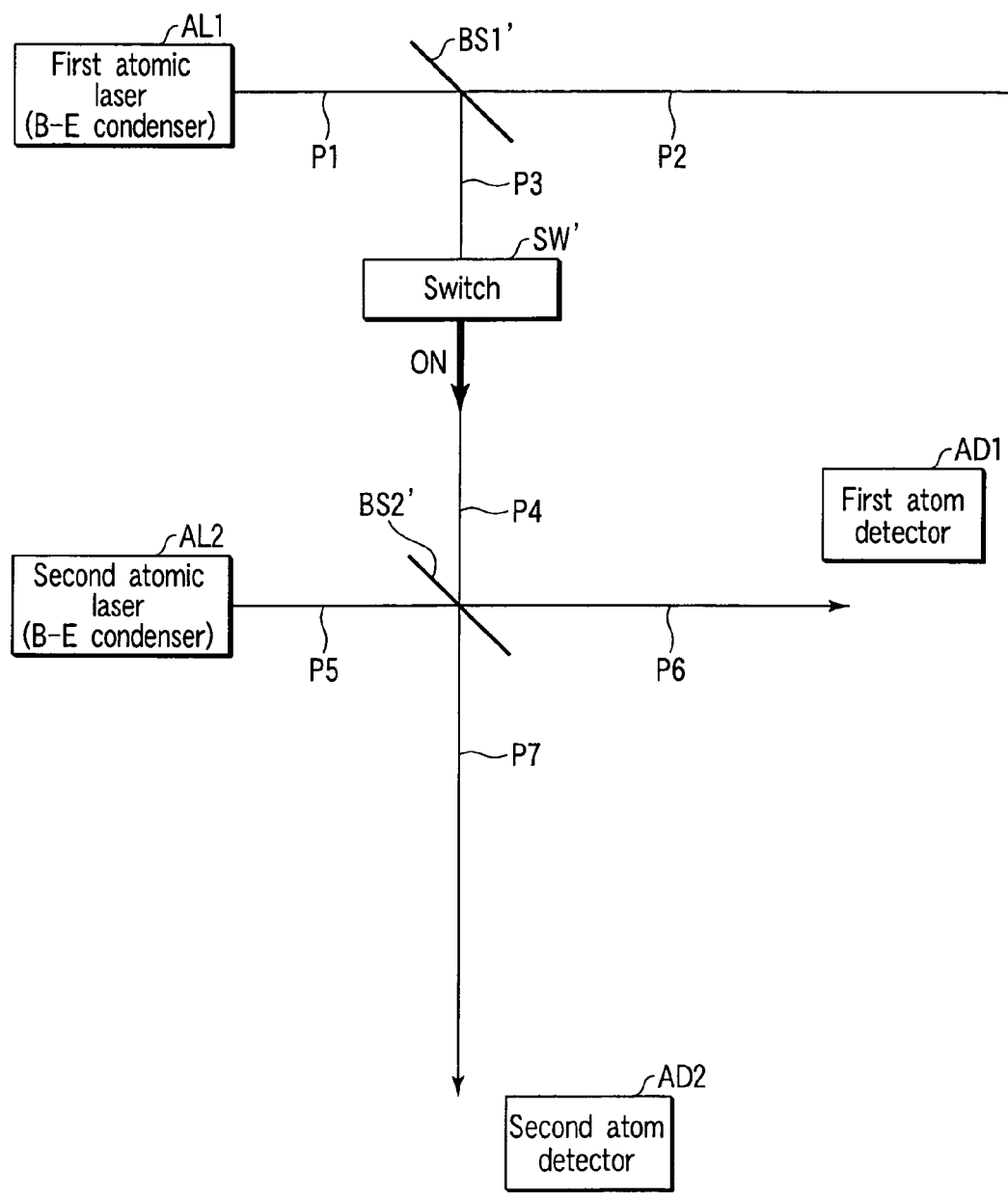
FIGS. 10 to 14 are type drawings illustrating the phase-correlation generation method in the same embodiment.
Figure 11:
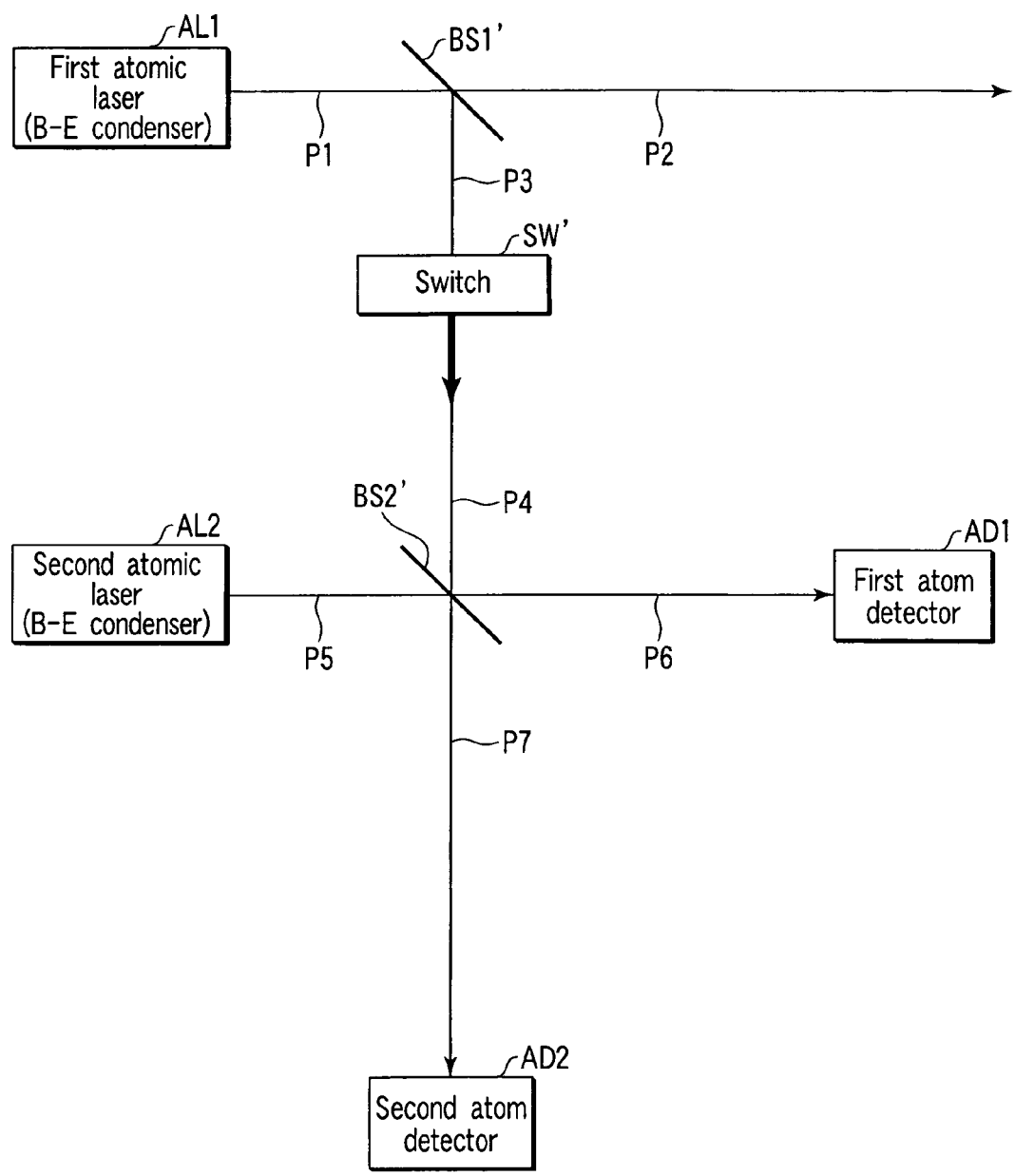
Figure 12:
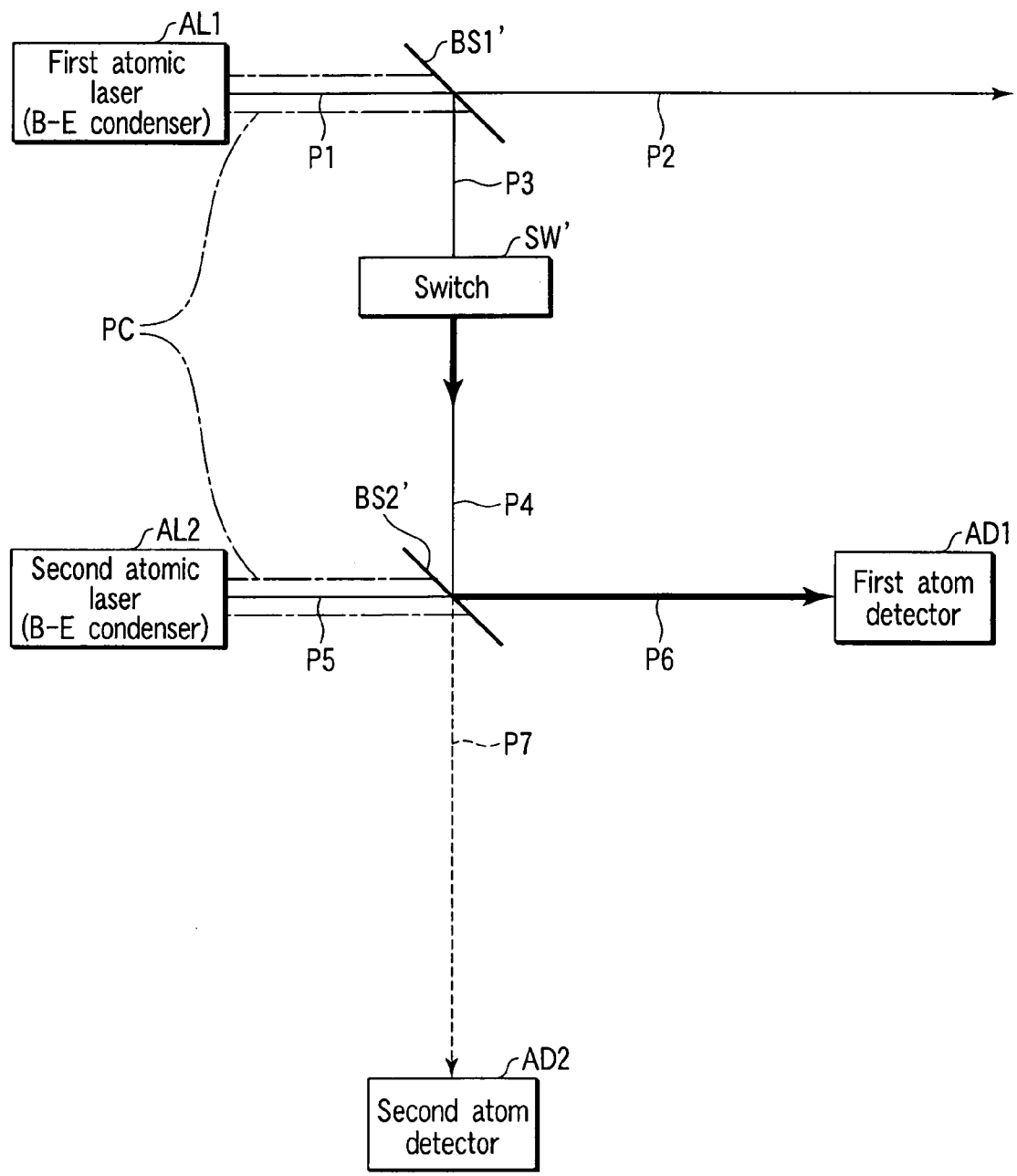
Figure 13:
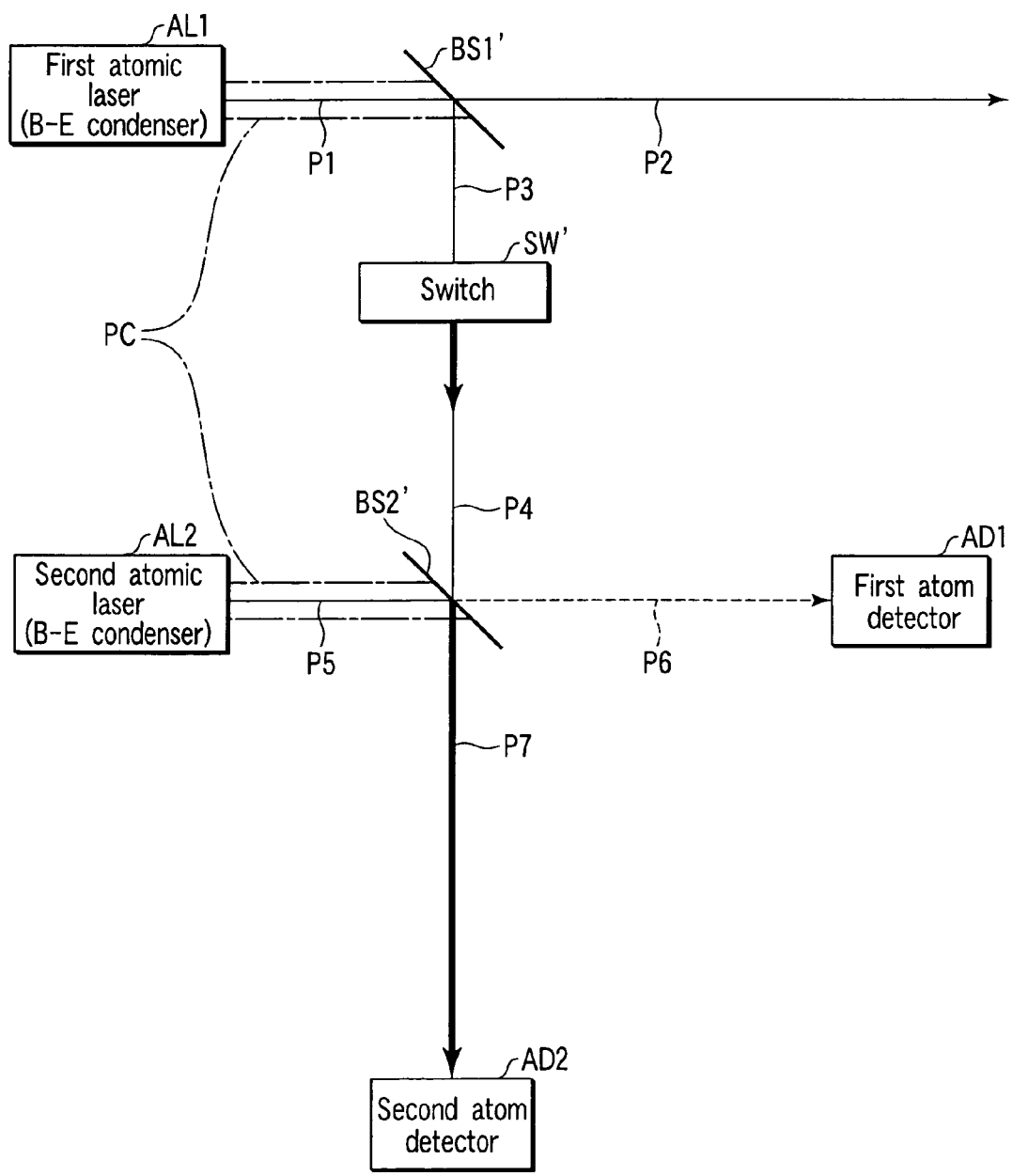
Figure 14:
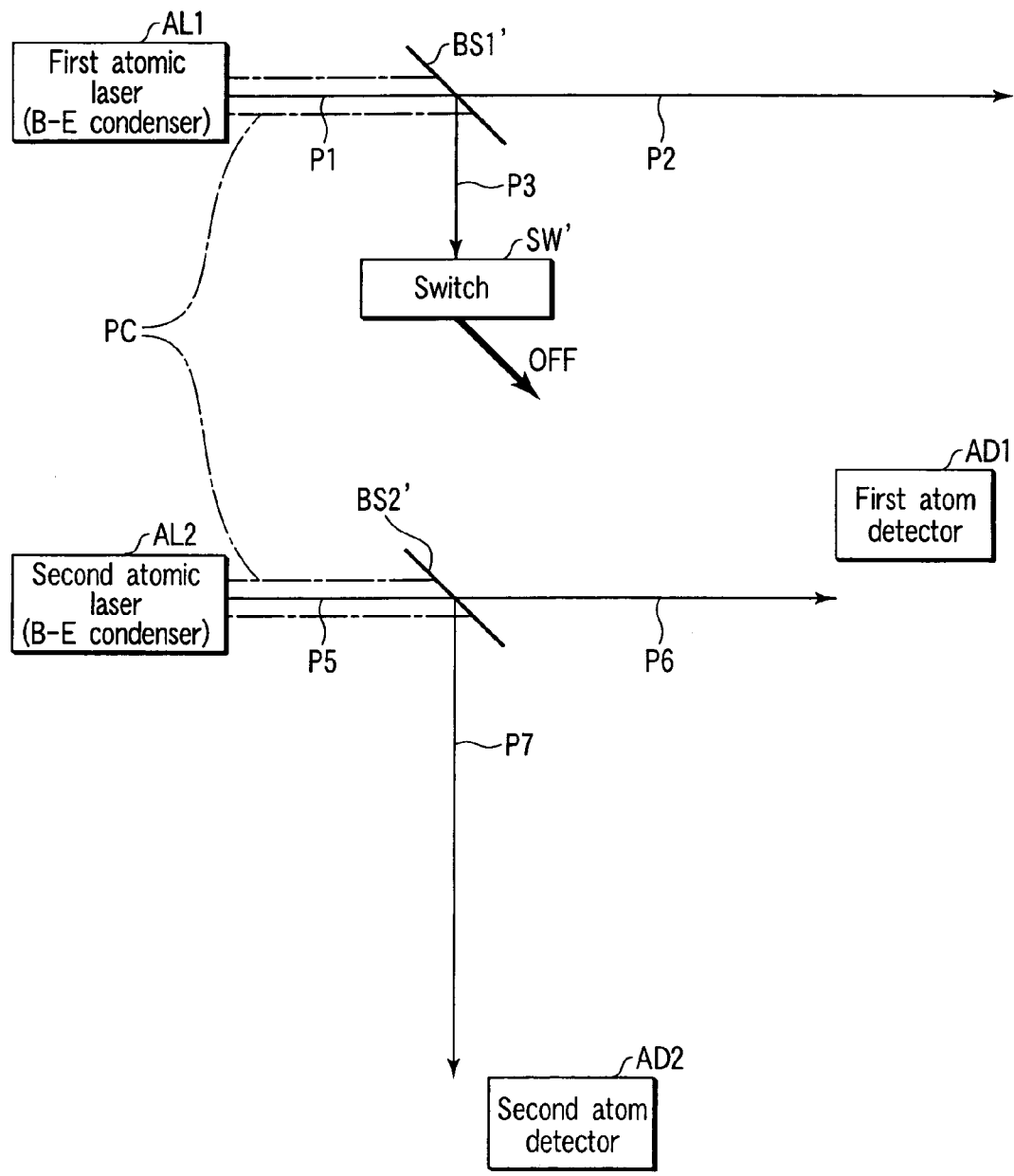

Even if the above-described structure is adopted, the phase-correlation can be generated between the respective laser fields generated by the respective atomic lasers AL1 and AL2 as shown in the flowchart of FIG. 9 and type drawings of FIG. 10 (ST 2'), FIG. 11 (ST 3'), FIG. 12 (ST 7'), FIG. 13 (ST 7'), and FIG. 14 (ST 8' and ST 9') like FIGS. 2 to 7 in the first embodiment.

It is to be noted that the present invention is not restricted to the foregoing embodiments, and various kinds of modifications can be carried out, without departing from the scope of the invention, at the embodying stage. Moreover, the respective embodiments may be appropriately combined and carried out to the extent possible. In this case, combined advantages can be obtained. Additionally, the foregoing embodiments include the invention at various stages, and many inventions can be extracted by appropriately combining a plurality of disclosed constituent requirements. For example, if the invention is extracted by, e.g., eliminating some of all constituent requirements disclosed in the embodiments, the eliminated part is appropriately supplemented with a known conventional technique when carrying out the extracted invention.

Further, the present invention can be modified and carried out in many ways without departing from the scope thereof.

What is claimed is:

1. A phase-correlation generation method which generates a phase-correlation between a plurality of laser fields, comprising:
    a step of generating a first laser field having a mixed quantum state represented by a single-mode Glauber coherent state that a phase is completely indeterminate;
    a step of generating a second laser field having the same quantum state as the aforesaid quantum state;
    a step of inputting the first laser field and the second laser field to diverging means which demonstrates an effect of a linear optical element or a mutual effect equivalent to this effect;
    a step of mixing the input first and second laser fields and outputting two quantum states by the diverging means; and
    a step of performing a quantum continuous measurement by causing absorbers in a quantum state to respectively cross the output two quantum states, and generating a phase-correlation between the first and second laser fields, wherein the phase-correlation is generated between the first and second laser fields when a large quantity of absorption is generated in one of the two quantum states due to the absorbers as a result of the quantum continuous measurement.

2. The phase-correlation generation method according to claim 1, wherein the first laser field is cut off at a position on the upstream side away from the diverging means after generating the phase-correlation.

3. The phase-correlation generation method according to claim 1, wherein the step of generating the first laser field and the step of generating the second laser field realize the mixed state in the quantum state by using a steady state of photons generated by an oscillating optical laser.

4. The phase-correlation generation method according to claim 3, further comprising:
    a step of preparing two photon detectors each having a time resolution with which the number of photons can be counted one by one;
    a step of realizing the quantum continuous measurement by causing the two photon detectors to cross the two quantum states output after mixing, and absorbing and detecting the photons; and
    a step of judging the generation of the phase-correlation based on a detection result of the photons;
    wherein the step of judging comprises:
    a step of comparing the photon number distributions of the two quantum states with each other; and
    a step of determining whether the laser fields have changed into fields having the phase-correlation when a ratio or a difference of their average photon numbers exceeds a predetermined value.

5. The phase-correlation generation method according to claim 3, further comprising:
    a step of preparing two photon detectors;
    a step of absorbing and spontaneously emitting photons by one of the two absorbers crossing the two quantum states, the absorbers being formed of an energy two-level atom group which resonates with a freguency of a mixed mode represented by the Glauber coherent state in the first and second laser fields, and having the energy of this atom group being set in a ground state;

a step of detecting spontaneous emission of the photons by one of the two photon detectors; and a step of judging the generation of the phase-correlation based on a detection result of the photons;

wherein the step of judging comprises:

a step of comparing the photon number distributions of the two quantum states with each other; and a step of determining whether the laser fields have changed into fields having the phase-correlation when a ratio or a difference of their average photon numbers exceeds a predetermined value.

6. The phase-correlation generation method according to claim 3, wherein the step of performing the quantum continuous measurement and generating the phase-correlation between the first and second laser fields includes:

a step of preparing an energy two-level atom group which resonates with a frequency of a mode in the mixed state;

a step of setting an energy of the energy two-level atom group to a ground state and obtaining absorbers composed of the energy two-level atom group in the ground state;

a step of generating atomic beams composed of individual atoms of the absorbers; and a step of causing the atomic beams to cross the two quantum states.

7. The phase-correlation generation method according to claim 1, wherein the step of generating the first laser field and the step of generating the second laser field realize the mixed state in the quantum state by using an atomic state produced by an atomic laser based on Bose-Einstein condensation.

8. The phase-correlation generation method according to claim 7, further comprising:

a step of preparing two atom detectors each having a time resolution with which the number of atoms can be counted one by one;

a step of causing the two atom detectors to cross the two quantum states output after mixing, and realizing the quantum continuous measurement by absorbing and detecting the atoms; and a step of judging the generation of the phase-correlation based on a detection result of the atoms.

9. A phase-correlation generation apparatus which generates a phase-correlation between a plurality of laser fields, comprising:

first laser field generating means for generating a first laser field having a mixed quantum state represented by a single-mode Glauber coherent state that a phase is completely indeterminate;

second laser field generating means for generating a second laser field having the same quantum state as the aforesaid quantum state;

diverging means for mixing the first and second laser fields, causing them to diverge into two quantum states and outputting them when the first and second laser fields are input; and means for performing a quantum continuous measurement by causing absorbers in a quantum state to individually cross the two output quantum states, wherein the phase-correlation is generated between the first and second laser fields when a large quantity of absorption is generated in one of the two quantum states due to the absorbers as a result of the quantum continuous measurement.

10. The phase-correlation generation apparatus according to claim 9, further comprising laser field cutting means for cutting the first laser field between the diverging means and the first laser field generating means when the phase-correlation is generated by the quantum continuous measurement.

11. The phase-correlation generation apparatus according to claim 9, wherein the first laser field generating means and the second laser field generating means realize the mixed state in the quantum state by using a steady state of photons generated by an oscillating optical laser.

12. The phase-correlation generation apparatus according to claim 11, further comprising first and second photon detectors each of which has a time resolution with which the number of photons can be counted one by one and which realize the quantum continuous measurement by crossing the two quantum states output after mixing and absorbing and detecting the photons.

13. The phase-correlation generation apparatus according to claim 11, further comprising first and second photon detectors which are used to detect photons spontaneously emitted from an absorber which has absorbed the photons in two absorbers crossing the two quantum states, the absorbers being formed of an energy two-level atom group which resonates with a frequency of a mixed mode represented by the Glauber coherent state in the first and second laser fields, and having the energy of this atom group being set in a ground state.

14. The phase-correlation generation apparatus according to claim 11, wherein the means for performing the quantum continuous measurement includes first and second atomic beam generating means for holding absorbers which are composed of energy two-level atom group which resonates with a frequency of a mode in the mixed state and have the energy being set to a ground state, generating atomic beams composed of individual atoms of the absorbers and causing the atomic beams to cross the two quantum states.

15. The phase-correlation generation apparatus according to claim 9, wherein the first laser field generating means and the second laser generating means realize the mixed state in the quantum state by using an atomic state produced by an atomic laser based on Bose-Einstein condensation.

16. The phase-correlation generation apparatus according to claim 15, further comprising first and second atom detectors each of which has a time resolution with which the number of atoms can be counted one by one and which realize the quantum continuous measurement by crossing the two quantum states output after mixing and absorbing and detecting the atoms.

17. A phase-correlation generation method which generates a phase-correlation between a plurality of laser fields, comprising:

a step of generating a first laser field having a mixed quantum state represented by a single-mode Glauber coherent state that a phase is completely indeterminate;

a step of generating a second laser field having the same quantum state as the aforesaid quantum state;

a step of inputting the first laser field and the second laser field to diverging means which demonstrates an effect of a linear optical element or a mutual effect equivalent to this effect;

a step of outputting two quantum states by mixing the input first and second laser fields by the diverging means; and a step of performing a quantum continuous measurement by causing absorbers in a quantum state to respectively cross the two output quantum states, the absorbers being formed of an energy two-level atom group which resonates with a freguency of a mixed mode represented by the Glauber coherent state in the first and second laser fields, and having the energy of this atom group being set in a ground state.

18. a phase-correlation generation method which generates a phase-correlation between a plurality of laser fields, comprising:

a step of generating a first laser field having a mixed quantum state represented by a single-mode Glauber coherent state that a phase is completely indeterminate;

a step of generating a second laser field having the same quantum state as the aforesaid quantum state;

a step of inputting the first laser field and the second laser field to diverging means which demonstrates an effect of a linear optical element or a mutual effect equivalent to this effect;

a step of mixing the input first and second laser fields and outputting two quantum states by the diverging means; and a step of performing a quantum continuous measurement by causing absorbers in a quantum state to respectively cross the output two quantum states, and generating a phase-correlation between the first and second laser fields, the quantum continuous measurement being performed under a time resolution with which the number of photons can be counted one by one.

19. The phase-correlation generation method according to claim 18, wherein the step of generating the first laser field and the step of generating the second laser field realize the mixed state in the quantum state by using a steady state of photons generated by an oscillating optical laser.

20. The phase-correlation generation method according to claim 19, further comprising:

a step of preparing two photon detectors each having the time resolution;

a step of realizing the quantum continuous measurement by causing the two photon detectors to cross the two quantum states output after mixing, and absorbing and detecting the photons; and a step of judging the generation of the phase-correlation based on a detection result of the number of photons.

21. The phase-correlation generation method of claim 19, further comprising:

a step of preparing two photon detectors each having the time resolution;

a step of absorbing and spontaneously emitting photons by one of the two absorbers crossing the two quantum states;

a step of detecting spontaneous emission of the photons by one of the two photon detectors; and a step of judging the generation of the phase-correlation based on detected photons.

* * * * *

UNITED STATES PATENT AND TRADEMARK OFFICE
CERTIFICATE OF CORRECTION

PATENT NO. : 7,092,417 B2
APPLICATION NO. : 10/752532
DATED : August 15, 2006
INVENTOR(S) : Fujii It is certified that error appears in the above-identified patent and that said Letters Patent is hereby corrected as shown below:

Column 13, line 9, change "a phase-correlation" to --A phase-correlation--.

Signed and Sealed this

Twenty-eighth Day of November, 2006

JON W. DUDAS
*Director of the United States Patent and Trademark Office*